United States Patent
Kaufman et al.

(10) Patent No.: US 10,491,645 B2
(45) Date of Patent: Nov. 26, 2019

(54) SYSTEM AND METHOD FOR SWITCHING BETWEEN ADAPTIVE BIT RATE AND FIXED RATE STREAMS

(71) Applicant: AT&T INTELLECTUAL PROPERTY I, L.P., Atlanta, GA (US)

(72) Inventors: Darren Kaufman, Sarasota, FL (US); Nicholas Nicas, Blue Springs, MO (US); Frank Coppa, Kansas City, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 238 days.

(21) Appl. No.: 15/446,460

(22) Filed: Mar. 1, 2017

(65) Prior Publication Data

US 2018/0255116 A1    Sep. 6, 2018

(51) Int. Cl.
*G06F 15/16*    (2006.01)
*H04L 29/06*    (2006.01)

(52) U.S. Cl.
CPC ...... *H04L 65/4092* (2013.01); *H04L 65/4084* (2013.01); *H04L 65/602* (2013.01)

(58) Field of Classification Search
CPC .............. H04L 65/4092; H04L 65/602; H04L 65/4084
See application file for complete search history.

(56) References Cited

U.S. PATENT DOCUMENTS

| | | | |
|---|---|---|---|
| 8,769,141 B2 | 7/2014 | Melnyk et al. | |
| 8,910,229 B2 | 12/2014 | Moorthy et al. | |
| 9,032,450 B2 | 5/2015 | Algie et al. | |
| 9,306,994 B2 | 4/2016 | Gahm et al. | |
| 9,313,249 B2 | 4/2016 | Soroushian et al. | |
| 9,338,486 B2 | 5/2016 | Phillips | |
| 9,374,604 B2 | 6/2016 | Nemiroff et al. | |
| 2011/0126248 A1 | 5/2011 | Fisher et al. | |
| 2013/0297743 A1 | 11/2013 | Eschet et al. | |
| 2014/0020037 A1 | 1/2014 | Hybertson et al. | |
| 2014/0149557 A1* | 5/2014 | Lohmar | H04L 65/605 709/219 |
| 2014/0223502 A1 | 8/2014 | Doblmaier et al. | |
| 2015/0085875 A1 | 3/2015 | Phillips | |
| 2015/0365450 A1 | 12/2015 | Gaunt | |

(Continued)

*Primary Examiner* — Padma Mundur

(74) *Attorney, Agent, or Firm* — Guntin & Gust, PLC; Ralph Trementozzi

(57) ABSTRACT

Aspects of the subject disclosure may include, for example, a method in which a connection is initiated to an adaptive bit rate (ABR) content delivery network delivering ABR data streams at different bit rates. A manifest associated with the network includes a profile of each data stream and its associated bit rate. The method also includes requesting delivery of content and downloading the content. If the download speed is greater than the delivery bit rate, the manifest is queried for a higher bit rate. If a higher bit rate is not available, a recommendation is received from the content delivery network to obtain additional content via an alternate content stream delivered by a second network. The method further includes selecting the profile for the alternate content stream from the manifest, and receiving the alternate content stream from the second network in accordance with the selecting. Other embodiments are disclosed.

20 Claims, 8 Drawing Sheets

(56) References Cited

U.S. PATENT DOCUMENTS

2016/0173915 A1 6/2016 McCarthy
2016/0182923 A1* 6/2016 Higgs .................. H04H 20/106
                                                    725/34
2016/0366489 A1* 12/2016 Major ................ H04N 21/2323

* cited by examiner

300

400

SYSTEM AND METHOD FOR SWITCHING BETWEEN ADAPTIVE BIT RATE AND FIXED RATE STREAMS

FIELD OF THE DISCLOSURE

The subject disclosure relates to providing streaming media over content distribution networks, and more particularly to a system and method for switching between adaptive bit rate (ABR) and fixed rate content streams.

BACKGROUND

The use of Adaptive Bit Rate (ABR) encoding/decoding systems for content delivery continues to grow. Meanwhile, fixed bit rate encoded content delivery methods are often available concurrently on delivery networks of internet service providers.

BRIEF DESCRIPTION OF THE DRAWINGS

Reference will now be made to the accompanying drawings, which are not necessarily drawn to scale, and wherein.

DETAILED DESCRIPTION

Figure 1:
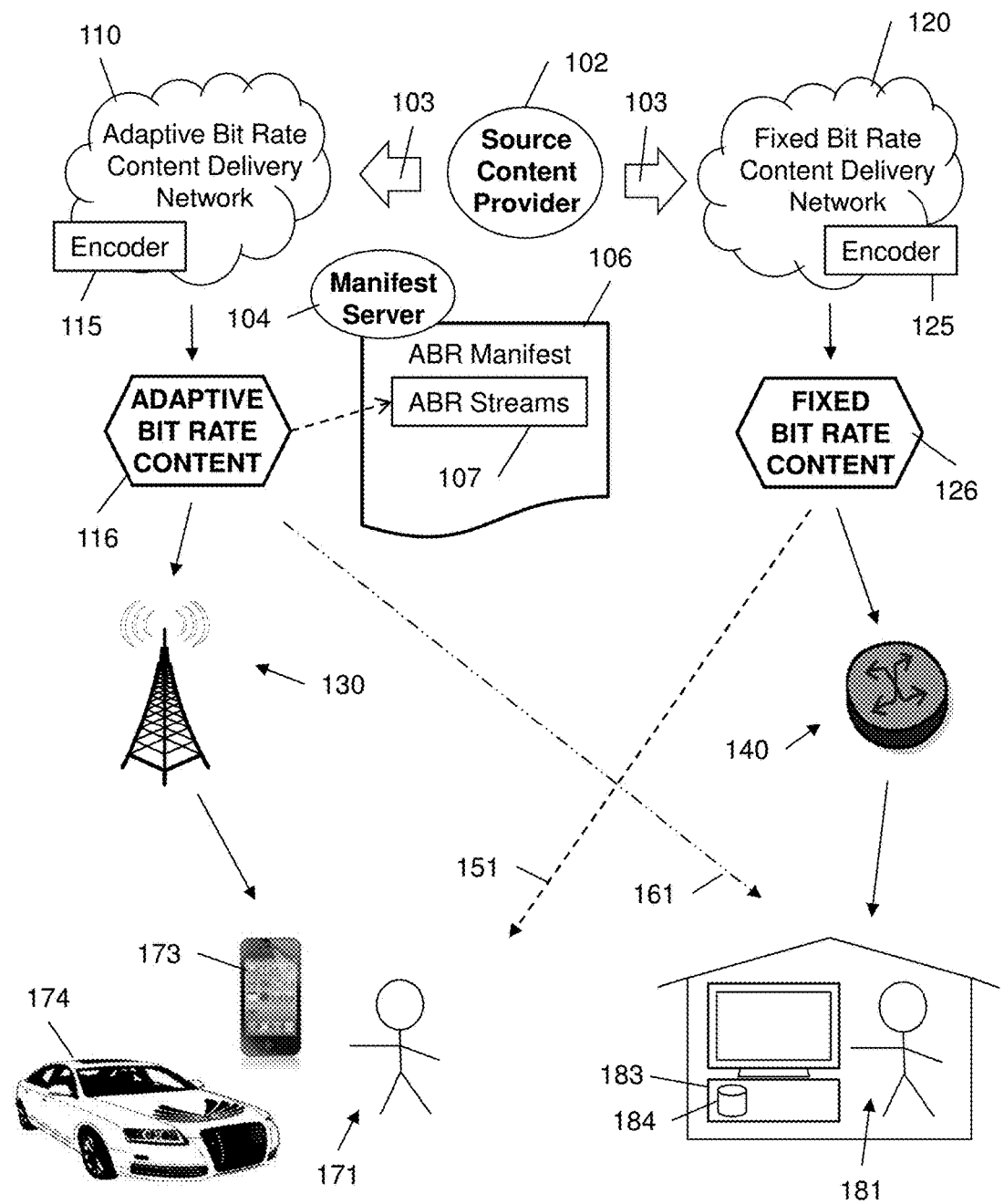
FIG. 1 schematically illustrates content delivery networks for delivering adaptive bit rate (ABR) and fixed bit rate content streams, in accordance with embodiments of the disclosure.

The subject disclosure describes, among other things, illustrative embodiments for switching delivery of content between an adaptive bit rate (ABR) stream and a fixed bit rate stream, using a modified manifest that includes a profile of each of the plurality of data streams including the bit rate associated therewith. Other embodiments are described in the subject disclosure.

One or more aspects of the subject disclosure include a method comprising initiating, by a processing system including a processor, a connection to a first content delivery network; the first content delivery network comprises an adaptive bit rate (ABR) content delivery network delivering content as a plurality of ABR data streams at different bit rates. A manifest associated with the ABR content delivery network includes a profile of each of the plurality of data streams including the bit rate associated therewith. The method also comprises requesting delivery of content at a first bit rate; downloading the content at a download speed; and, responsive to determining that the download speed is greater than the first bit rate, querying the manifest for a second bit rate greater than the first bit rate. The method further comprises receiving, in accordance with a determination by the ABR content delivery network that the second bit rate is not available, a first recommendation from the ABR content delivery network to obtain additional content via an alternate content stream; a profile for the alternate content stream is included in the manifest while being delivered by a second content delivery network. The method further comprises selecting the profile for the alternate content stream from the manifest, and receiving the alternate content stream from the second content delivery network in accordance with the selecting.

One or more aspects of the subject disclosure include a device comprising a processing system including a processor and a memory that stores executable instructions that, when executed by the processing system, facilitate performance of operations. The operations comprise initiating a connection to a first content delivery network; the first content delivery network comprises an adaptive bit rate (ABR) content delivery network delivering content as a plurality of ABR data streams at different bit rates. A manifest associated with the ABR content delivery network includes a profile of each of the plurality of data streams including the bit rate associated therewith. The operations also comprise requesting delivery of content at a first bit rate; downloading the content at a download speed; and, responsive to determining that the download speed is greater than the first bit rate, querying the manifest for a second bit rate greater than the first bit rate. The operations further comprise receiving a first recommendation from the ABR content delivery network to obtain additional content via an alternate content stream, in accordance with a determination by the ABR content delivery network that the second bit rate is not available. A profile for the alternate content stream is included in the manifest while being delivered by a second content delivery network; the second content delivery network delivers the alternate content stream at a fixed bit rate. The ABR data streams have a first encoding and the alternate content stream has a second encoding different from the first encoding. The operations also comprise selecting the profile for the alternate content stream from the manifest, and receiving the alternate content stream from the second content delivery network in accordance with the selecting.

One or more aspects of the subject disclosure include a machine-readable storage medium comprising executable instructions that, when executed by a processing system including a processor, facilitate performance of operations. The operations comprise initiating a connection to a first content delivery network; the first content delivery network comprises an adaptive bit rate (ABR) content delivery network delivering content as a plurality of ABR data streams at different bit rates. A manifest associated with the ABR content delivery network includes a profile of each of the plurality of data streams including the bit rate associated therewith. The operations also comprise requesting delivery of content at a first bit rate; downloading the content at a download speed; and, responsive to determining that the download speed is greater than the first bit rate, querying the manifest for a second bit rate greater than the first bit rate. The operations further comprise receiving, in accordance with a determination by the ABR content delivery network that the second bit rate is not available, a first recommendation from the ABR content delivery network to obtain additional content via an alternate content stream. A profile for the alternate content stream is included in the manifest while being delivered by a second content delivery network; the second content delivery network delivers the alternate content stream at a fixed bit rate greater than a maximum bit rate of the plurality of ABR data streams. The operations also comprise selecting the profile for the alternate content stream from the manifest, and receiving the alternate content stream from the second content delivery network in accordance with the selecting.

FIG. 1 depicts an illustrative embodiment 100 in which content is distributed to communication devices (typically devices of a subscriber to a network) in home-based and mobile environments. As shown in FIG. 1, a source content provider 102 can deliver content 103 to an ABR content delivery network 110 and to a fixed bit rate content delivery network 120. The source content is encoded by encoders 115, 125 included in (or associated with) delivery networks 110, 120 respectively. In general, an ABR content stream 116 and a fixed bit rate content stream 126 will be encoded differently.

A user 171 can receive streaming content at mobile devices (e.g. a handheld device 173, a device installed in a car 174, etc.) via a connection to a wireless network (e.g. a cellular network) 130. A home-based user 181 can concurrently receive streaming content at a stationary device (e.g. a set-top box 183, including local content storage 184) via a connection to a fixed bit rate delivery service (e.g. including a network of video head-end servers) 140.

In some situations, user 171 is at a location where fixed bit rate delivery 151 of a content stream is available as well as an ABR content stream. An ABR network user receives content stream 116 at a rate limited by the encoding rate of encoder 115. If the user's mobile devices (e.g. devices 173, 174 of user 171) are capable of receiving content at a higher rate, it then may be desirable for those devices to switch to fixed bit rate content stream 126; the fixed bit rate can be a higher rate than available from the ABR delivery network. Conversely, if devices of user 181 (e.g. set top box 183) encounter quality degradation or packet loss in content stream 126, and an ABR content stream is available, it may be desirable for those devices to switch to delivery 161 of the ABR content stream.

In situations where a client device can select between ABR and a fixed bit rate for delivery of a content stream, the selection may depend on the type of content. For example, during a presentation of live content the amount of data to be encoded is not known in advance; an adaptive bit rate may thus be preferable. However, when pre-recorded content is delivered, the amount of data (file size) is already known; it then may be preferable to use a fixed bit rate (generally higher than available ABR bit rates) for faster delivery of the content.

In this embodiment, a manifest server 104 included in (or associated with) ABR content delivery network 110 maintains a manifest file 106 including profiles 107 for the available ABR content streams. In general, a stream of ABR content is segmented and is available at several different bit rates; each available bit rate is associated with a distinct profile in the manifest.

Figure 2:
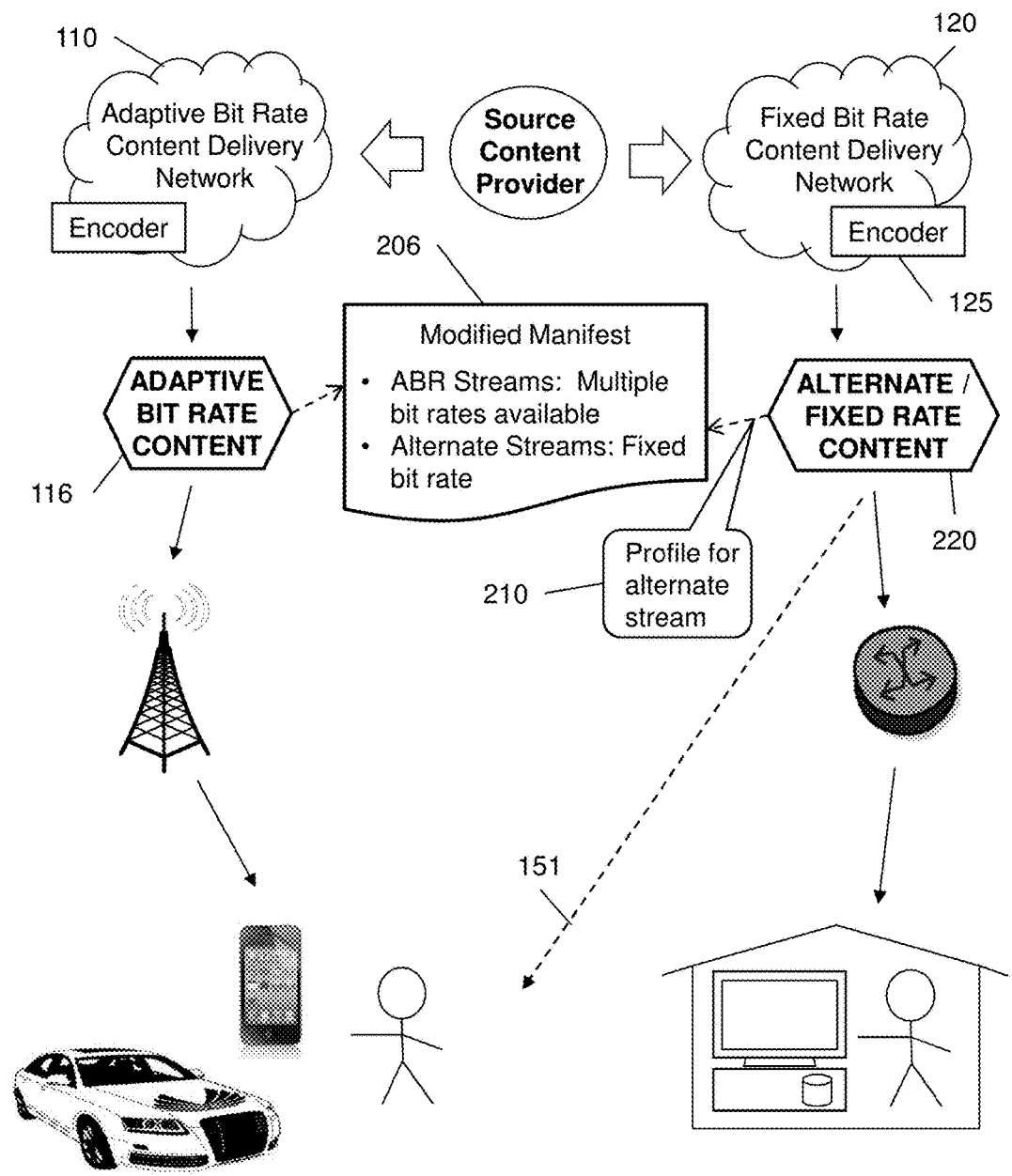
FIG. 2 schematically illustrates a procedure for switching between an ABR content stream and an alternate (fixed bit rate) content stream, in accordance with embodiments of the disclosure.

FIG. 2 schematically illustrates a procedure for switching between an ABR content stream and an alternate (fixed bit rate) content stream, in accordance with embodiments of the disclosure. In an embodiment, the ABR manifest is modified to generate a modified manifest 206 that includes a profile 210 for an alternate content stream. In this embodiment, the alternate content stream is a fixed bit rate stream 220 delivered by content delivery network 120; the alternate content stream has a higher bit rate than is available from the ABR content delivery network.

In an embodiment, the manifest is modified by the manifest server associated with the ABR content delivery network. In another embodiment, the manifest is modified by a system maintained by an internet service provider that communicates with both the ABR content delivery network and the fixed bit rate content delivery network. In an embodiment, the modified manifest 206 includes additional instructions for directing the streaming content, provided by the system orchestrating the modification of the manifest; this system can be a system associated with the ABR content delivery network, a system associated with the fixed bit rate content delivery network, or both. In this embodiment, addition of the alternate stream profile 210 to the modified manifest 206 permits a client device to switch from ABR content stream 116 to alternate stream 126.

Switching between content sources may require switching between differently encoded streams. In an embodiment, a non-ABR encoded stream (e.g. from encoder 125) can be delivered via a fixed bit rate content delivery network and have synchronous identification points, marked via metadata, corresponding to endpoints and/or beginning points of ABR stream segments. The metadata can be inserted into the stream in the encoding process, or in subsequent processing of the stream; this can enable identification of synchronized switching points between ABR and non-ABR content sources.

Figure 3:
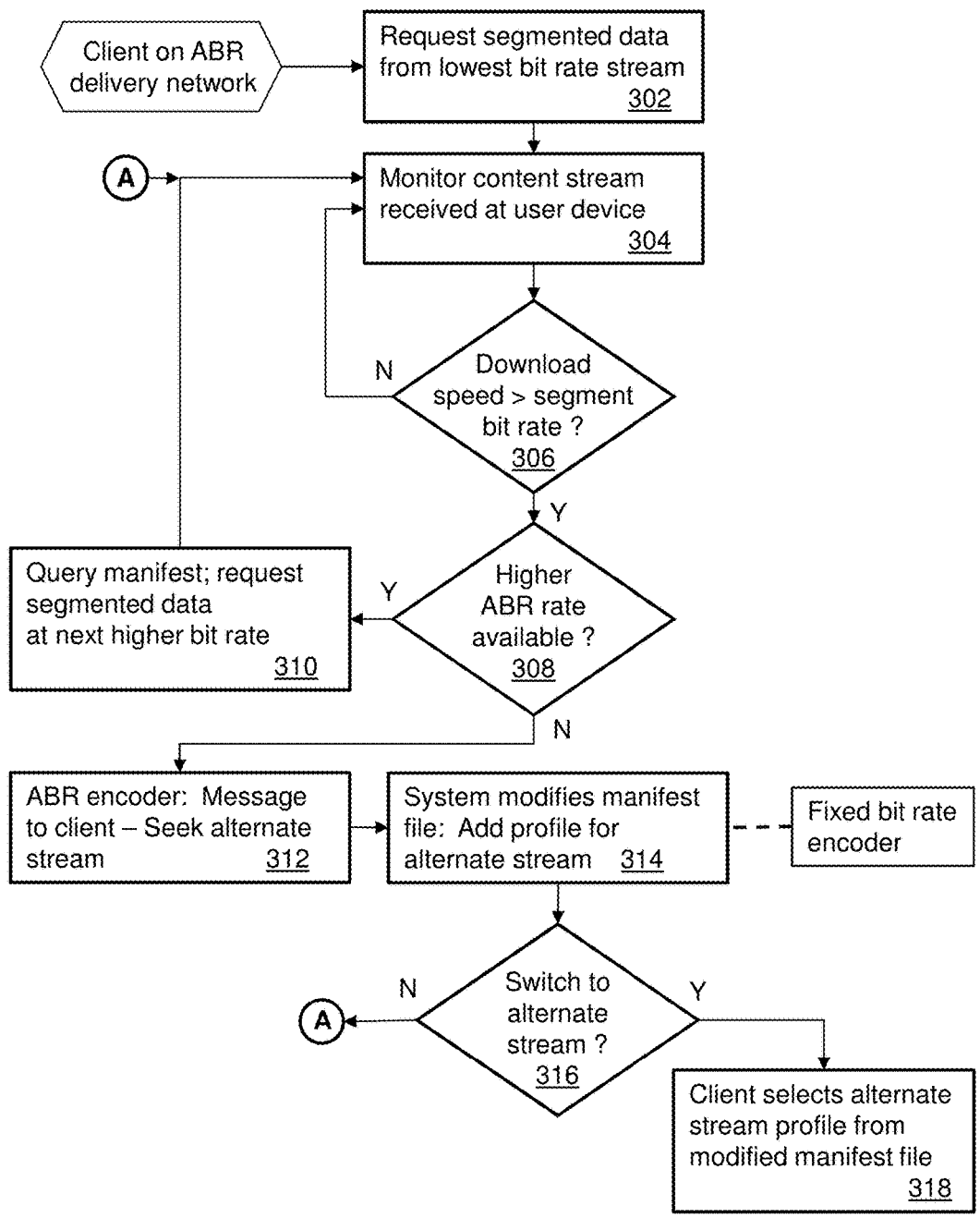
FIGS. 3-4 are flowcharts depicting illustrative embodiments of methods used in portions of the system described in FIGS. 1 and 2.

FIG. 3 is a flowchart 300 depicting an illustrative embodiment of a method for switching from an ABR content stream to an alternate content stream. To obtain delivery of content, a client connected to an ABR delivery network can request one or more segments of data from a content stream having the lowest bit rate (step 302). The content stream, and the rate at which the content stream is downloaded to the client device, are monitored (step 304).

If the client finds that the download speed is greater than the bit rate of the segment being downloaded (step 306), and a higher bit rate is available (step 308/Y), the client can query the manifest to request segment(s) at the next higher bit rate (step 310). If a higher ABR bit rate is not available from the ABR encoder (step 308/N), the ABR encoder can send a message to the client, recommending that the client use an alternate content stream (step 312).

A system (e.g. manifest server, internet service provider, etc.) modifies the ABR manifest to include a profile for an alternate stream (step 314), thereby enabling the client to select the alternate stream. In this embodiment, the alternate stream is delivered by the fixed bit rate encoder, via the fixed bit rate content delivery system, at a bit rate higher than the highest bit rate available from the ABR encoder via the ABR content delivery network.

If the client determines that a switch from the ABR content stream to the alternate content stream is to be made (step 316), the client selects the alternate stream profile from the modified ABR manifest file (step 318). In another embodiment, the modified ABR manifest includes an instruction to the client to access a different delivery system, and/or to search for a profile on another manifest associated with the fixed rate content delivery network.

Figure 4:
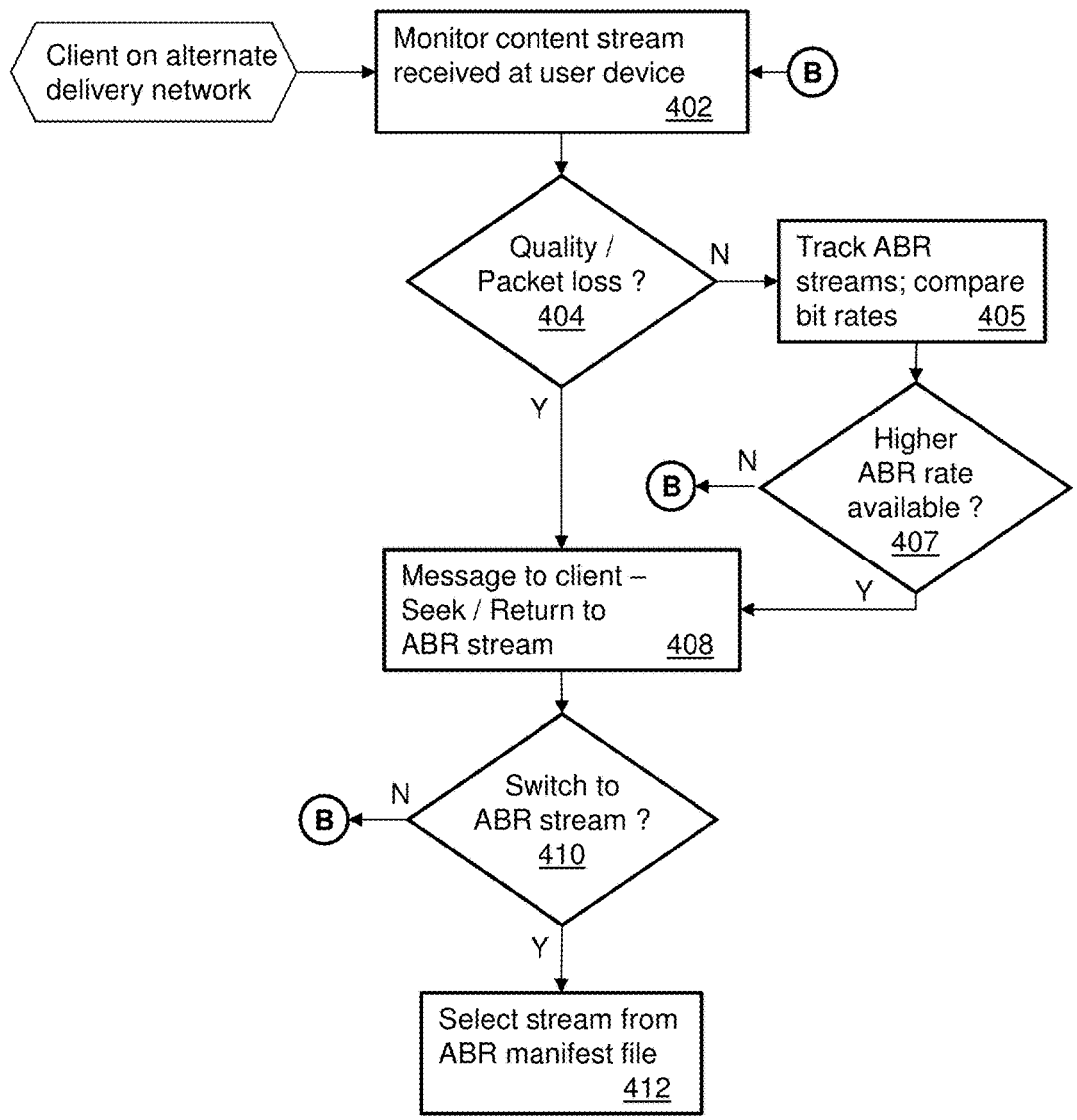

FIG. 4 is a flowchart 400 depicting an illustrative embodiment of a method for switching from a fixed bit rate content stream to an ABR content stream. The content stream delivered to the client device is monitored for quality (step 402). If a degradation of quality (e.g. packet losses) is detected (step 404), the system orchestrating switching between ABR and alternate streams can direct a message to the client (step 408), recommending that the client seek an ABR content stream (or return to the ABR content stream it was receiving previously).

In this embodiment, the ABR content streams and their associated bit rates are monitored, in addition to monitoring the quality of the alternate content stream (step 405). If it is found that an ABR bit rate is available that is higher than the fixed bit rate (step 407), a message can be sent to the client recommending that the client seek an ABR stream with the higher bit rate.

If the client determines that a switch from the alternate content stream to an ABR content stream is to be made (step 410), the client selects a stream profile from the ABR manifest file (step 412). In an embodiment, a system communicating with the ABR content delivery network maintains a log of client activity that tracks switching from an ABR content stream to an alternate content stream. In this embodiment, if the client signals a return from the alternate content stream, the system can automatically reinstate the ABR content stream at the client's previous ABR bit rate.

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
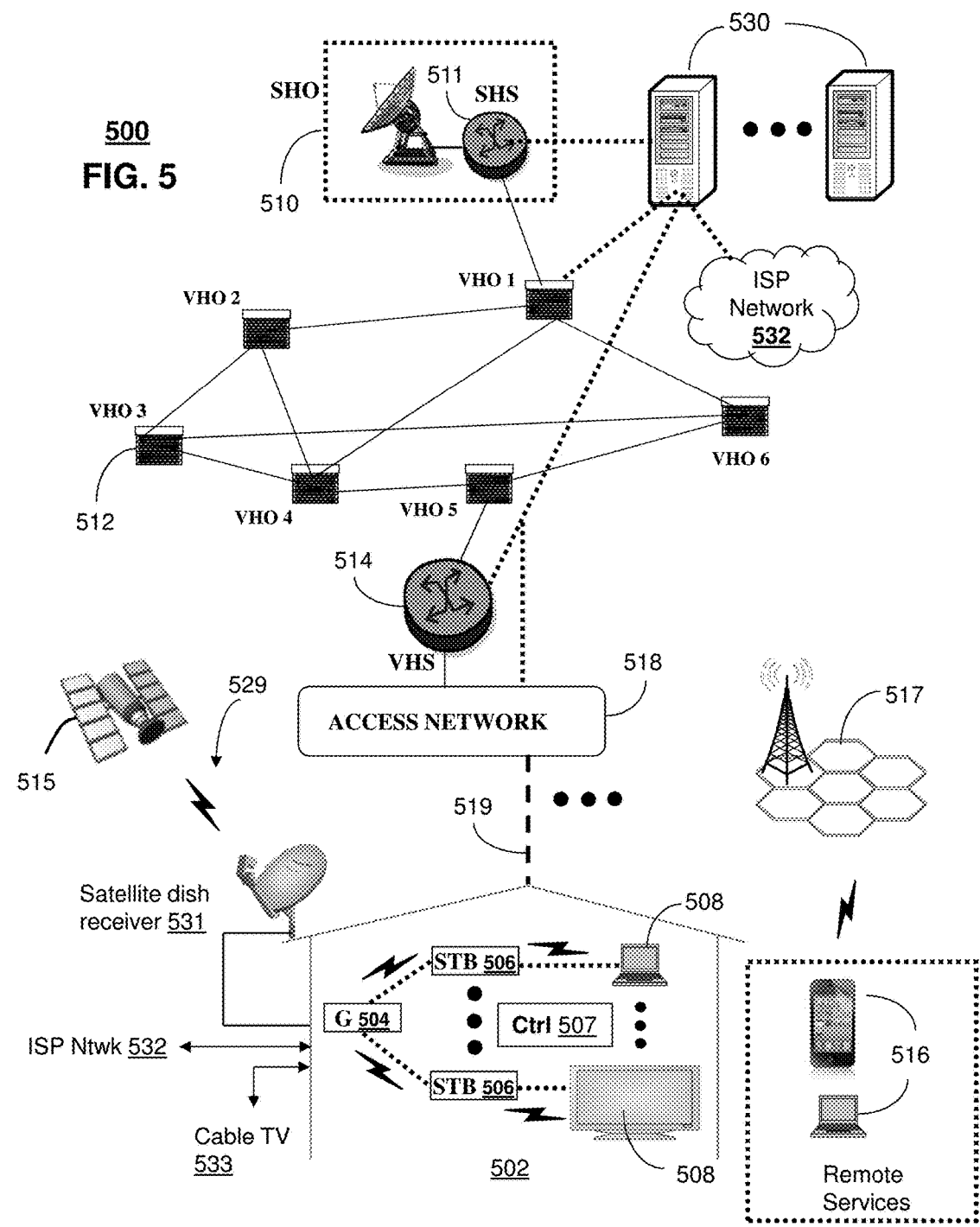
FIGS. 5-6 depict illustrative embodiments of communication systems that provide media services to devices shown in FIGS. 1 and 2.

FIG. 5 depicts an illustrative embodiment of a first communication system 500 for delivering media content. The communication system 500 can represent an Internet Protocol Television (IPTV) media system. Communication system 500 can be overlaid or operably coupled with the systems of FIGS. 1 and/or 2 as another representative embodiment of communication system 500. For instance, one or more devices illustrated in the communication system 500 of FIG. 5 can perform a method comprising initiating, by a processing system including a processor, a connection to a first content delivery network; the first content delivery network can include an adaptive bit rate (ABR) content delivery network delivering content as a plurality of ABR data streams at different bit rates. A manifest associated with the ABR content delivery network can include a profile of each of the plurality of data streams including the bit rate associated therewith. The method can also comprise requesting delivery of content at a first bit rate; downloading the content at a download speed; and, responsive to determining that the download speed is greater than the first bit rate, querying the manifest for a second bit rate greater than the first bit rate. The method can further comprise receiving, in accordance with a determination by the ABR content delivery network that the second bit rate is not available, a first recommendation from the ABR content delivery network to obtain additional content via an alternate content stream; a profile for the alternate content stream can be included in the manifest while being delivered by a second content delivery network. The method can further comprise selecting the profile for the alternate content stream from the manifest, and receiving the alternate content stream from the second content delivery network in accordance with the selecting.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a content delivery server (herein referred to as server 530). The server 530 can use computing and communication technology to perform, among other things, techniques described by methods 300-400 of FIGS. 3-4. The media processors 506 and wireless communication devices 516 can be provisioned with software functions to utilize the services of server 530.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
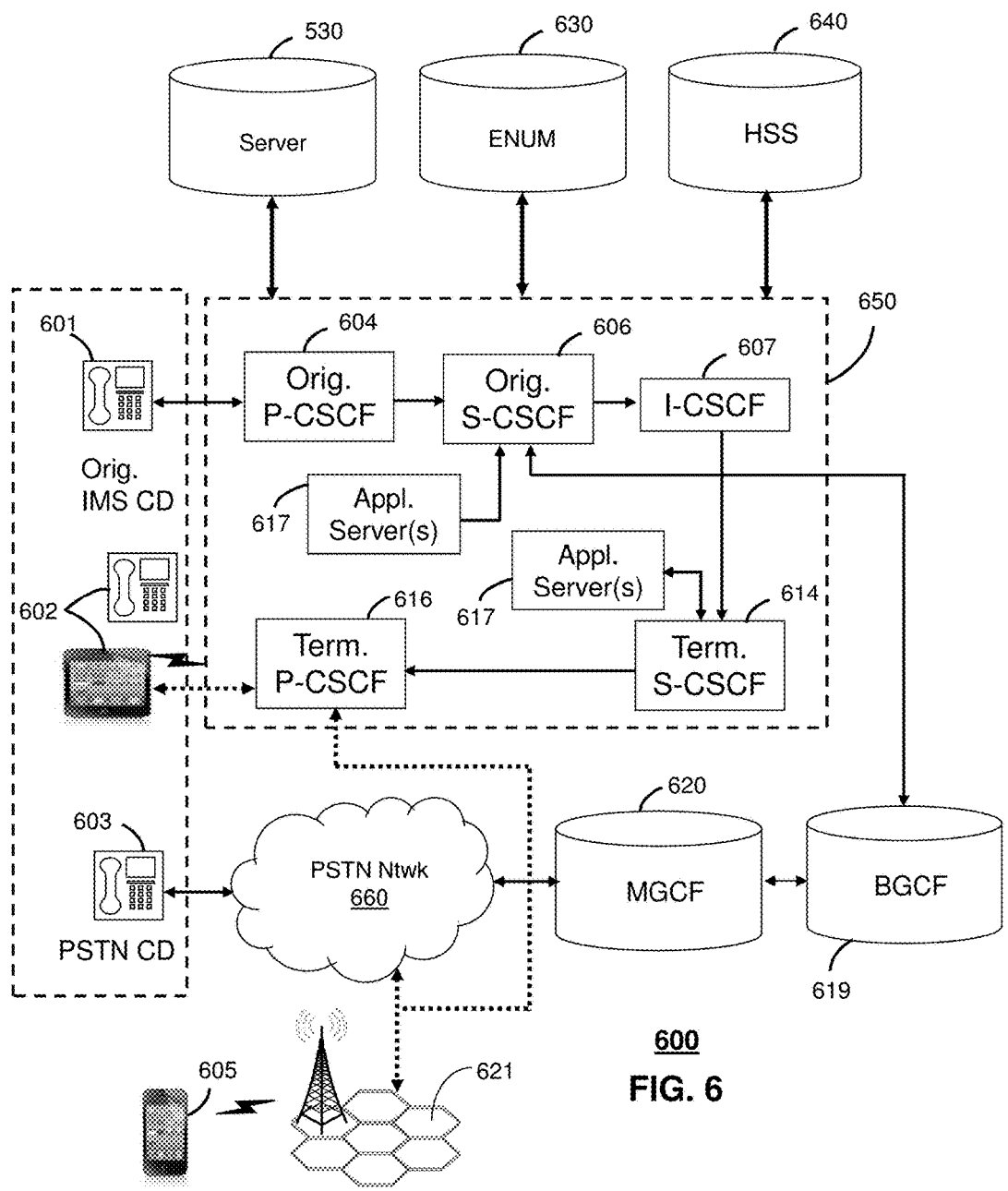

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with the systems of FIGS. 1 and/or 2 and communication system 500 as another representative embodiment of communication system 500. This embodiment can comprise a device that includes a processing system and a memory that stores executable instructions that, when executed by the processing system, facilitate performance of operations. The operations can comprise initiating a connection to a first content delivery network; the first content delivery network comprises an adaptive bit rate (ABR) content delivery network delivering content as a plurality of ABR data streams at different bit rates. A manifest associated with the ABR content delivery network includes a profile of each of the plurality of data streams including the bit rate associated therewith. The operations can also comprise requesting delivery of content at a first bit rate; downloading the content at a download speed; and, responsive to determining that the download speed is greater than the first bit rate, querying the manifest for a second bit rate greater than the first bit rate. The operations can further comprise receiving a first recommendation from the ABR content delivery network to obtain additional content via an alternate content stream, in accordance with a determination by the ABR content delivery network that the second bit rate is not available. A profile for the alternate content stream can be included in the manifest while being delivered by a second content delivery network; the second content delivery network can deliver the alternate content stream at a fixed bit rate. The ABR data streams can have a first encoding and the alternate content stream can have a second encoding different from the first encoding. The operations can also comprise selecting the profile for the alternate content stream from the manifest, and receiving the alternate content stream from the second content delivery network in accordance with the selecting. .

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 530 of FIG. 5 can be operably coupled to communication system 600 for purposes similar to those described above. CDs 601, 602, 603 and 605, which can be adapted with software to utilize the services of the server 530. Server 530 can be an integral part of the application server(s) 617, which can be adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
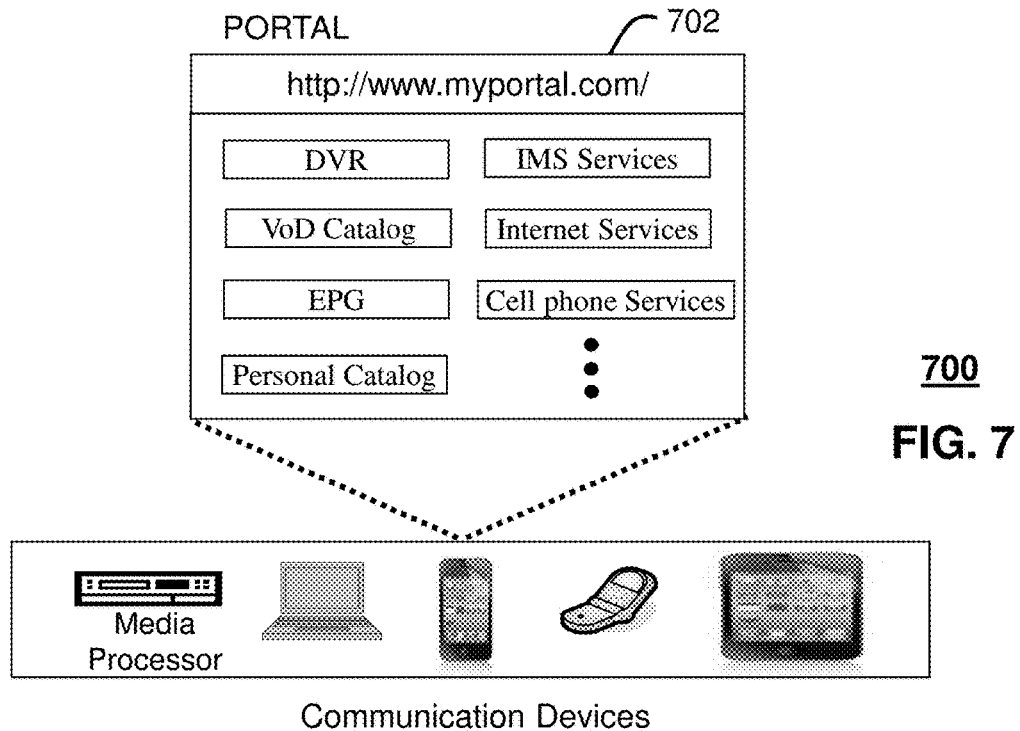
FIG. 7 depicts an illustrative embodiment of a web portal for interacting with the communication systems of FIGS. 5-6.

FIG. 7 depicts an illustrative embodiment of a web portal 702 of a communication system 700. Communication system 700 can be overlaid or operably coupled with the systems shown in FIGS. 1 and/or 2, communication system 500, and/or communication system 600 as another representative embodiment of the systems shown in FIGS. 1 and/or 2, communication system 500, and/or communication system 600. The web portal 702 can be used for managing services of the systems shown in FIGS. 1 and/or 2 and communication systems 500-600. A web page of the web portal 702 can be accessed by a Uniform Resource Locator (URL) with an Internet browser using an Internet-capable communication device such as those described in FIGS. 1-2 and 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications to adapt these applications as may be desired by subscribers and/or service providers of the systems shown in FIGS. 1 and/or 2 and communication systems 500-600. Service providers can log onto an administrator account to provision, monitor and/or maintain the systems shown in FIGS. 1 and/or 2 or server 530.

Figure 8:
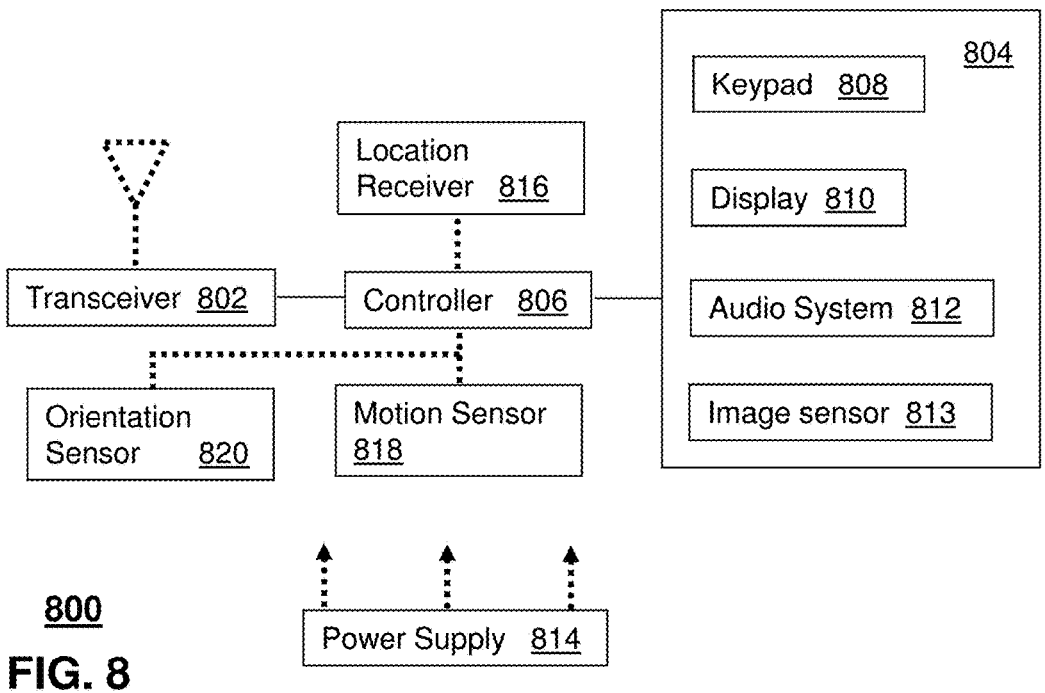
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1 and/or 2, and FIGS. 5-6 and can be configured to perform portions of methods 300-400 of FIGS. 3-4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1 and/or 2, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems of FIGS. 1 and/or 2 and communication systems 500-600 of FIGS. 5-6 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
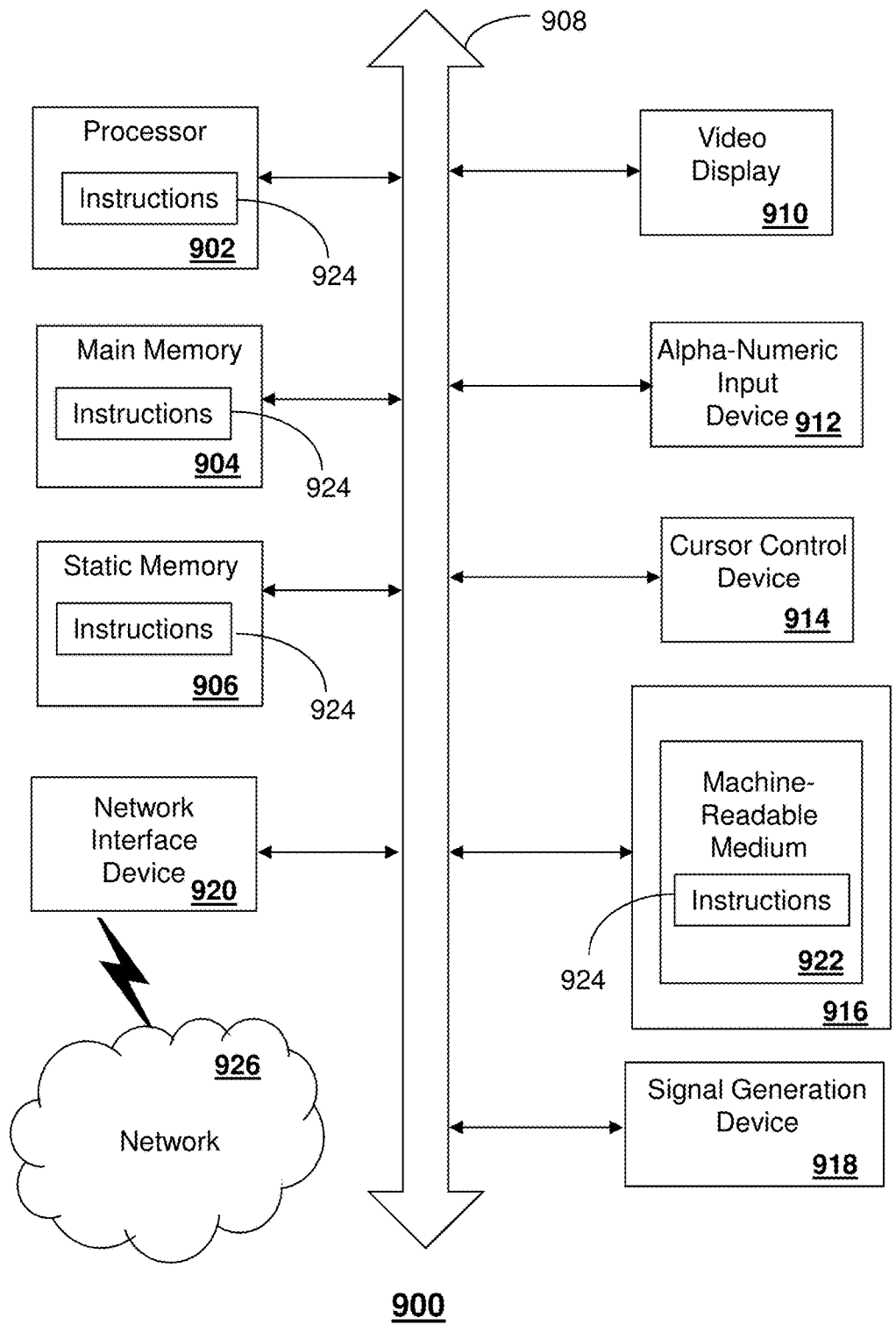
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the server 530, the media processor 506, the manifest server 104, the encoders 115, 125, and other devices of FIGS. 1-2. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   initiating, by a processing system including a processor, a connection to a first content delivery network, wherein the first content delivery network comprises an adaptive bit rate (ABR) content delivery network delivering content as a plurality of ABR data streams at different bit rates, wherein a manifest associated with the ABR content delivery network includes a profile of each of the plurality of ABR data streams including the bit rate associated therewith;
   requesting, by the processing system, delivery of content at a first bit rate;
   downloading, by the processing system, the content at a download speed;
   responsive to determining that the download speed is greater than the first bit rate, querying, by the processing system, the manifest for a second bit rate greater than the first bit rate; and
   in accordance with a determination by the ABR content delivery network that the second bit rate is not available:
   receiving, by the processing system, a first recommendation from the ABR content delivery network to obtain additional content via an alternate content stream, wherein the manifest is modified to generate a modified manifest including a profile for the alternate content stream, the processing system thereby enabled to obtain the additional content via the alternate content stream, the alternate content stream being delivered by a second content delivery network, wherein the second content delivery network delivers the alternate content stream at a fixed bit rate greater than a maximum bit rate of the plurality of ABR data streams;
   selecting, by the processing system, the profile for the alternate content stream from the modified manifest; and
   receiving, by the processing system, the alternate content stream from the second content delivery network in accordance with the selecting.

2. The method of claim 1, further comprising selecting, by the processing system, an ABR data stream from the plurality of ABR data streams.

3. The method of claim 1, wherein the ABR data streams have a first encoding and the alternate content stream has a second encoding different from the first encoding.

4. The method of claim 2, wherein the selected ABR data stream comprises segments each having a beginning point and an endpoint, and wherein the alternate content stream comprises identification points corresponding to the beginning point and the endpoint respectively of each of the segments.

5. The method of claim 1, wherein the processing system comprises a client device communicating with the ABR content delivery network and accessing the manifest.

6. The method of claim 5, wherein the first recommendation is included in the manifest.

7. The method of claim 1, further comprising:
receiving, by the processing system, a second recommendation from the second content delivery network to obtain further additional content from the ABR content delivery network.

8. The method of claim 7, wherein the second recommendation is received in accordance with detection of a degradation in quality of the received alternate content stream.

9. The method of claim 8, wherein the degradation in quality comprises a packet loss in the received alternate content stream.

10. A device, comprising:
a processing system including a processor; and
a memory that stores executable instructions that, when executed by the processing system, facilitate performance of operations comprising:
initiating a connection to a first content delivery network, wherein the first content delivery network comprises an adaptive bit rate (ABR) content delivery network delivering content as a plurality of ABR data streams at different bit rates, wherein a manifest associated with the ABR content delivery network includes a profile of each of the plurality of ABR data streams including the bit rate associated therewith;
requesting delivery of content at a first bit rate;
downloading the content at a download speed;
responsive to determining that the download speed is greater than the first bit rate, querying the manifest for a second bit rate greater than the first bit rate; and
in accordance with a determination by the ABR content delivery network that the second bit rate is not available:
receiving a first recommendation from the ABR content delivery network to obtain additional content via an alternate content stream, wherein the manifest is modified to generate a modified manifest including a profile for the alternate content stream, the processing system thereby enabled to obtain the additional content via the alternate content stream, the alternate content stream being delivered by a second content delivery network, wherein the second content delivery network delivers the alternate content stream at a fixed bit rate greater than a maximum bit rate of the plurality of ABR data streams, and wherein the ABR data streams have a first encoding and the alternate content stream has a second encoding different from the first encoding;
selecting the profile for the alternate content stream from the modified manifest; and
receiving the alternate content stream from the second content delivery network in accordance with the selecting.

11. The device of claim 10, wherein the operations further comprise selecting an ABR data stream from the plurality of ABR data streams.

12. The device of claim 10, wherein the processing system comprises a client device communicating with the ABR content delivery network and accessing the manifest.

13. The device of claim 12, wherein the first recommendation is included in the manifest.

14. The device of claim 10, wherein the operations further comprise:
receiving a second recommendation from the second content delivery network to obtain further additional content from the ABR content delivery network.

15. The device of claim 14, wherein the second recommendation is received in accordance with detection of a degradation in quality of the received alternate content stream.

16. A machine-readable storage medium comprising executable instructions that, when executed by a processing system including a processor, facilitate performance of operations comprising:
initiating a connection to a first content delivery network, wherein the first content delivery network comprises an adaptive bit rate (ABR) content delivery network delivering content as a plurality of ABR data streams at different bit rates, wherein a manifest associated with the ABR content delivery network includes a profile of each of the plurality of ABR data streams including the bit rate associated therewith;
requesting delivery of content at a first bit rate;
downloading the content at a download speed;
responsive to determining that the download speed is greater than the first bit rate, querying the manifest for a second bit rate greater than the first bit rate; and
in accordance with a determination by the ABR content delivery network that the second bit rate is not available;
receiving a first recommendation from the ABR content delivery network to obtain additional content via an alternate content stream, wherein the manifest is modified to generate a modified manifest including a profile for the alternate content stream, the processing system thereby enabled to obtain the additional content via the alternate content stream, the alternate content stream being delivered by a second content delivery network, wherein the second content delivery network delivers the alternate content stream at a fixed bit rate greater than a maximum bit rate of the plurality of ABR data streams;
selecting the profile for the alternate content stream from the modified manifest; and
receiving the alternate content stream from the second content delivery network in accordance with the selecting.

17. The machine-readable storage medium of claim 16, wherein the ABR data streams have a first encoding and the alternate content stream has a second encoding different from the first encoding.

18. The machine-readable storage medium of claim 16, wherein the operations further comprise:
receiving, by the processing system, a second recommendation from the second content delivery network to obtain further additional content from the ABR content delivery network; and
selecting, by the processing system, an ABR data stream from the plurality of ABR data streams.

19. The machine-readable storage medium of claim 18, wherein the second recommendation is received in accordance with detection of a degradation in quality of the received alternate content stream.

20. The machine-readable storage medium of claim 19, wherein the degradation in quality comprises a packet loss in the received alternate content stream.

* * * * *

UNITED STATES PATENT AND TRADEMARK OFFICE
CERTIFICATE OF CORRECTION

PATENT NO. : 10,491,645 B2
APPLICATION NO. : 15/446460
DATED : November 26, 2019
INVENTOR(S) : Kaufman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
Twenty-fourth Day of January, 2023

Katherine Kelly Vidal
*Director of the United States Patent and Trademark Office*